(12) United States Patent
Skrypchuk et al.

(10) Patent No.: US 11,908,209 B2
(45) Date of Patent: Feb. 20, 2024

(54) VEHICLE CONTROL SYSTEM

(71) Applicants: JAGUAR LAND ROVER LIMITED, Whitley Coventry (GB); UCL BUSINESS PLC., London (GB)

(72) Inventors: Lee Skrypchuk, Whitley Coventry (GB); Rebecca Matthias, Whitley Coventry (GB); Alexandros Mouzakitis, Whitley Coventry (GB); Nilli Lavie, London (GB); Anthony Harris, London (GB); Joshua Eayrs, London (GB)

(73) Assignees: JAGUAR LAND ROVER LIMITED, Coventry (GB); UCL BUSINESS PLC, London (GB)

( * ) Notice: Subject to any disclaimer, the term of this patent is extended or adjusted under 35 U.S.C. 154(b) by 0 days.

(21) Appl. No.: 17/593,234

(22) PCT Filed: Mar. 10, 2020

(86) PCT No.: PCT/EP2020/056316
§ 371 (c)(1),
(2) Date: Sep. 13, 2021

(87) PCT Pub. No.: WO2020/182797
PCT Pub. Date: Sep. 17, 2020

(65) Prior Publication Data
US 2022/0058408 A1    Feb. 24, 2022

(30) Foreign Application Priority Data

Mar. 13, 2019   (GB) ...................................... 1903421

(51) Int. Cl.
*G06V 20/59*    (2022.01)
*B60W 60/00*    (2020.01)
(Continued)

(52) U.S. Cl.
CPC ........... *G06V 20/597* (2022.01); *B60W 40/08* (2013.01); *B60W 50/082* (2013.01);
(Continued)

(58) Field of Classification Search
CPC .. G06V 20/597; B60W 40/08; B60W 50/082; B60W 50/16; B60W 60/0053;
(Continued)

(56) References Cited

U.S. PATENT DOCUMENTS 10,011,216 B1   7/2018  Rovik
10,464,575 B2 * 11/2019  Abe ................ B60W 30/18163
(Continued)

FOREIGN PATENT DOCUMENTS

| DE | 102015201369 A1 | 7/2016 |
|---|---|---|
| EP | 3438948 A1 | 2/2019 |
| WO | 2018113857 A1 | 6/2018 |

OTHER PUBLICATIONS

Great Britain Intellectual Property Office, Combined Search and Examination Report Issued in Application No. GB1903421.4, dated Aug. 29, 2019, 6 pages.
(Continued)

*Primary Examiner* — Mohamed Barakat
(74) *Attorney, Agent, or Firm* — McCoy Russell LLP

(57) ABSTRACT

Aspects of the present disclosure relate to a control system, system and method for controlling a transition between a first driving mode and a second driving mode of a vehicle. The present disclosure relates to receiving image data of an occupant of the vehicle; quantifying one or more characteristics of the occupant's gaze based at least in part on the received image data, the one or more characteristics being indicative of the occupant's attention to a non-driving task; determining a transition profile for transitioning between the first driving mode and the second driving mode based at
(Continued)

least in part on the one or more characteristics of the occupant's gaze; and generating and outputting a control signal to transition from the first driving mode to the second driving mode, the control signal comprising instructions for controlling one or more vehicle systems in accordance with the determined transition profile.

18 Claims, 7 Drawing Sheets

(51) Int. Cl.
*B60W 40/08* (2012.01)
*B60W 50/08* (2020.01)
*B60W 50/16* (2020.01)
*G06F 3/01* (2006.01)
*B60W 50/14* (2020.01)

(52) U.S. Cl.
CPC ........ *B60W 50/16* (2013.01); *B60W 60/0053* (2020.02); *G06F 3/013* (2013.01); *B60W 2040/0818* (2013.01); *B60W 2050/143* (2013.01); *B60W 2050/146* (2013.01); *B60W 2540/225* (2020.02); *B60W 2540/229* (2020.02)

(58) Field of Classification Search
CPC ... B60W 2040/0818; B60W 2050/143; B60W 2050/146; B60W 2540/225; B60W 2540/229; G06F 3/013
See application file for complete search history.

(56) References Cited

U.S. PATENT DOCUMENTS

| | | | |
|---|---|---|---|
| 2016/0214618 A1* | 7/2016 | Wulf | B60Q 9/00 |
| 2016/0311323 A1* | 10/2016 | Lee | G06F 3/013 |
| 2016/0339916 A1* | 11/2016 | Norton | B60W 30/16 |
| 2018/0329414 A1 | 11/2018 | Igarashi et al. | |
| 2019/0064800 A1 | 2/2019 | Frazzoli et al. | |
| 2019/0156150 A1* | 5/2019 | Krishnan | A61B 3/113 |
| 2019/0278268 A1* | 9/2019 | Rezaeian | G05D 1/0061 |
| 2019/0299996 A1* | 10/2019 | Stübing | B60W 30/18145 |
| 2020/0064833 A1* | 2/2020 | Fox | B60W 60/0057 |

OTHER PUBLICATIONS

ISA European Patent Office, International Search Report and Written Opinion Issued in Application No. PCT/EP2020/056316, dated May 25, 2020, WIPO, 12 pages.

* cited by examiner

VEHICLE CONTROL SYSTEM

CROSS REFERENCE TO RELATED APPLICATIONS

The present application is a U.S. National Phase of International Application No. PCT/EP2020/056316 entitled "VEHICLE CONTROL SYSTEM," and filed on Mar. 10, 2020. International Application No. PCT/EP2020/056316 claims priority to Great Britain Patent Application No. 1903421.4 filed on Mar. 13, 2019. The entire contents of each of the above-listed applications are hereby incorporated by reference for all purposes.

TECHNICAL FIELD

The present disclosure relates to a vehicle control system for controlling a transition between a first driving mode and a second driving mode of a vehicle. Aspects of the disclosure relate to a control system, system, vehicle, method, computer software and a computer readable medium.

BACKGROUND AND SUMMARY

It is known to provide a control system for a vehicle in which an occupant is instructed, under certain circumstances, to engage (e.g. re-engage) with a driving task. For example, in the context of a vehicle operating in an autonomous mode, it may be necessary or desirable in certain circumstances to transfer control of the vehicle to the occupant.

In some circumstances when the vehicle is operating in an autonomous mode, an occupant may be able to perform a non-driving task (e.g. reading a book, interacting with a mobile device such as a smartphone or tablet, etc.). It would be advantageous to account for this occupant interaction with a non-driving task when determining how and when to transfer control of the vehicle back to the occupant.

It is an aim of the present disclosure to address one or more of the disadvantages associated with the prior art.

Aspects and embodiments of the disclosure provide a control system, a system, a vehicle, a method, computer software and a computer readable medium as claimed in the appended claims.

According to an aspect of the present disclosure there is provided a control system for controlling a transition between a first driving mode and a second driving mode of a vehicle, the second driving mode requiring a higher level of interaction from an occupant than the first driving mode, the control system comprising one or more controllers, the control system configured to: receive image data of the occupant of the vehicle; quantify one or more characteristics of the occupant's gaze in dependence on the received image data, the one or more characteristics being indicative of the occupant's attention to a non-driving task; determine a transition profile for transitioning between the first driving mode and the second driving mode in dependence on the one or more characteristics of the occupant's gaze; and generate and output a control signal to transition from the first driving mode to the second driving mode; wherein the control signal comprises instructions for controlling one or more vehicle systems in accordance with the transition profile.

Advantageously, the control system of the present disclosure is configured to utilise one or more gaze characteristics to, for example, determine how engaged the occupant is with the non-driving task. The transition profile can be adjusted such that the transition between driving modes is tailored to the requirements of the driving situation. In contrast, present systems may provide a set transition profile which may not be suitable for different occupants who may engage with different non-driving tasks in varying manners.

In some embodiments, the one or more controllers collectively comprise: at least one electronic processor having an electrical input for receiving the image data; and at least one memory device electrically coupled to the at least one electronic processor and having instructions stored therein; and wherein the at least one electronic processor is configured to access the at least one memory device and execute the instructions thereon so as to generate and output the control signal to the one or more vehicle systems.

The one or more characteristics of the occupant's gaze may comprise a gaze direction. Advantageously, the present disclosure is able to determine what the occupant is looking at—for example, a hand-held device, an in-vehicle infotainment screen, etc. The one or more characteristics of the occupant's gaze may comprise a gaze duration on a target. Advantageously, the control system may be configured to identify instances where an occupant may be fixated on a non-driving task. The one or more characteristics of the occupant's gaze may comprise a saccade duration, saccade length, saccade velocity and/or saccade direction. Advantageously, quantifying saccade characteristics allows the control system to identify characteristics associated with different tasks and/or different attention levels to a non-driving task.

As is understood in the field, the term "saccade" should be interpreted as the movement of an occupant's eyes/gaze between two or more phases of fixation. The term "phases of fixation" is to be understood as periods in which the occupant's eyes/gaze is substantially stationary. Given that in practice an occupant's eyes/gaze would rarely be completely stationary, substantially stationary should be interpreted as intending to cover eye/gaze movements below a threshold speed or threshold acceleration, for example. A saccade duration comprises the time taken for the occupant's gaze to move between two phases of fixation. A saccade length comprises the angular distance through which the occupant's eye moves when moving between two phases of fixation. A saccade direction comprises the direction of movement of the occupant's eyes when moving between two phases of fixation. A saccade velocity comprises the speed and direction in which the occupant's eyes/gaze moves between two phases of fixation.

The control system may be configured to determine an attention parameter in dependence on the one or more characteristics of the occupant's gaze.

The attention parameter may comprise a measurement of a perceptual load of the occupant when engaging with the non-driving task. In some embodiments the attention parameter comprises a relative measurement of a perceptual load of the occupant when engaging with the non-driving task. For example, the control system may be configured to categorize a measured perceptual load of the occupant into two or more categories, e.g. high, medium and low. The control system may be configured to determine the transition profile in dependence on the category of measured perceptual load of the occupant engaging with the non-driving task.

The control system may be configured to receive data indicative of a type of non-driving task being performed. In some embodiments, the control system may be configured to identify the non-driving task being performed by the occupant in dependence on the received data. Optionally, the control system may be configured to determine the attention parameter in dependence on the identified non-driving task.

Optionally, the received data may comprise data indicative of use of a vehicle system, such as an infotainment system, for example. The received data may be indicative of occupant interaction with a mobile device, for example, which may be inferred through receipt of communication signals from the device.

The received data may comprise sensor data. Optionally, the sensor data comprises image data of the occupant. For example, the image data may be received from one or more cameras within the vehicle cabin. In embodiments, the control system may be configured to receive image data from one or more cameras located within the vehicle and identify the one or more characteristics of the occupant's gaze in dependence thereon. Additionally or alternatively, the control system may be configured to receive image data from one or more cameras located within the vehicle and identify the non-driving task being performed by the occupant in dependence thereon.

The control system may be configured to receive physiological sensor data indicative of a level of electrical activity of the occupant's brain. For example, the control system may be configured to receive the physiological data from one or more electroencephalogram (EEG) sensors. The EEG sensors may be worn by the occupant. Optionally, the control system may be configured to determine the attention parameter in dependence on the received physiological sensor data.

In some embodiments the control signal comprises instructions for controlling one or more vehicle output devices for providing an audio, a visual, and/or a haptic transition indicator to the occupant, the or each transition indicators notifying the occupant of an upcoming transition between the first and second driving modes. In such embodiments the control system may be configured to adjust one or more of an intensity, volume and/or duration of the or each transition indicator in dependence on the one or more characteristics of the occupant's gaze. In some embodiments the control system may be configured to adjust a number of transition indicators provided, and/or a frequency of transition indicators provided. Advantageously, the transition indicator(s) can be adjusted according to a level of engagement of the occupant with a non-driving task. It is expected that occupants showing a high level of engagement with a non-driving task will require increased intensity and/or increased frequency alerts/indicators to bring their attention back to a driving task. Adjusting the intensity, volume and/or duration of any indicator may account for such situations and/or allow for indicators to be reduced in intensity where an occupant has a low level of engagement with a non-driving task, e.g. to prevent occupant annoyance. In embodiments, the control system may be configured to adjust one or more of an intensity, volume and/or duration of the or each transition indicator in dependence on the determined attention parameter.

In some embodiments the transition profile comprises a time period within which a transition between the first and second driving modes is to occur. In such embodiments, the control system may be configured to adjust the time period in dependence on the one or more characteristics of the occupant's gaze. Advantageously, the control system is configured to tailor the transition profile in accordance with the occupant's engagement with a non-driving task. For example, more time may be required to increase engagement of an occupant with a driving task where the occupant is showing a high attention level to a non-driving task when compared with an occupant showing a lower attention level to the non-driving task. Adjusting the time period allows for the timing of the transition to concur with the time taken to increase the occupant's engagement with a driving task. In embodiments, the control system may be configured to adjust the time period in dependence on the determined attention parameter.

The time period may be between a time at which a request to transition from the first driving mode to the second driving mode is identified, and a time at which a transition between the driving modes is to occur. The time period may be between the current time and the time at which the transition between the driving modes is to occur.

In some embodiments the transition profile comprises a transition position ahead of the vehicle at which the transition between the first and second driving modes will occur. In such embodiments the control system may be configured to adjust the location of the transition position in dependence on the one or more characteristics of the occupant's gaze. Advantageously, the control system is configured to tailor the transition profile in accordance with the occupant's engagement with a non-driving task. For example, more time may be required to increase engagement of an occupant with a driving task where the occupant is showing a high attention level to a non-driving task when compared with an occupant showing a lower attention level to the non-driving task. Adjusting the location of a transition position ahead of the vehicle allows for the timing of the transition to concur with the time taken, and hence the distance travelled by the vehicle, to increase the occupant's engagement with a driving task. Optionally, the control system may be configured to adjust the location of the transition position in dependence on the attention parameter.

The location of the transition position may be determined with respect to a distance between a location at which a request to transition from the first driving mode to the second driving mode is identified, and a location at which a transition between the driving modes is to occur. The location of the transition positon may be determined with respect to a current location of the vehicle.

In some embodiments the control system is configured to receive an input signal indicative of a request to transition between driving modes. Optionally, the input signal may be received from a vehicle control module.

The control system may be configured to determine the transition profile in advance of a request to transition from the first driving mode to the second driving mode being identified.

The first driving mode may be an autonomous driving mode. The second driving mode may be a manual driving mode, for example a driving mode requiring at least one manual occupant input to control the vehicle. In such embodiments, one or more controls of the vehicle, e.g. movement in a lateral or longitudinal direction may be controlled autonomously when in the manual driving mode. In some embodiments both the first and second driving modes are autonomous driving modes, with the second driving mode requiring a higher level of occupant interaction with the vehicle than the first driving mode. For example, the second driving mode, whilst operating substantially autonomously, may require an occupant to be observing the driving environment (e.g. eyes on the road/track/path, etc.) and/or require occupant contact with one or more controls (e.g. hand(s) on steering wheel). In such embodiments, the first driving mode may require less or no occupant interaction in such fashions described herein.

In some embodiments the control system is configured to monitor the occupant's response to the transition from the first driving mode to the second driving mode before and/or during the transition. The control system may be configured to output a further control signal to one or more vehicle systems to transfer the vehicle to a third driving mode, at any time before or during the transition from the first driving mode to the second driving mode, in dependence on the occupant's response to the transition not meeting one or more response criteria. For example, the control system may be configured to determine whether the occupant has reduced their level of interaction with the non-driving task, and/or increased their level of interaction with driving task (e.g. eyes on the road, hands on the steering wheel, etc.) in preparation for the transition between the driving modes of the vehicle. The one or more response criteria may comprise the occupant having eyes on the road/track/driving environment, the occupant having one or more hands on a steering wheel of the vehicle, and/or an attention level of the occupant to the non-driving task meeting a pre-determined threshold level, for example. The third driving mode may comprise controlling the vehicle to come to a stop, for example stop in lane, pull over to the side of the road and/or drive to a predetermined location (e.g. a lay-by).

According to an aspect of the present disclosure there is provided a system for controlling a transition between a first driving mode and a second driving mode of a vehicle, the system comprising: a control system according to any preceding aspect of the disclosure; and an image sensor configured to obtain image data of an occupant of the vehicle.

According to an aspect of the disclosure there is provided a vehicle comprising the control system or the system as described herein.

According to an aspect of the disclosure there is provided a method for controlling a transition between a first driving mode and a second driving mode of a vehicle, the second driving mode requiring a higher level of interaction from an occupant than the first driving mode, the method comprising: receiving image data of an occupant of the vehicle; quantifying one or more characteristics of the occupant's gaze in dependence on the received image data, the one or more characteristics being indicative of the occupant's attention to a non-driving task; determining a transition profile for transitioning between the first driving mode and the second driving mode in dependence on the one or more characteristics of the occupant's gaze; and generating and outputting a control signal to transition from the first driving mode to the second driving mode, the control signal comprising instructions for controlling one or more vehicle systems in accordance with the determined transition profile.

The one or more characteristics of the occupant's gaze may comprise a gaze direction. The one or more characteristics of the occupant's gaze may comprise a gaze duration on a target. The one or more characteristics of the occupant's gaze may comprise a saccade duration, a saccade length, a saccade velocity and/or a saccade direction.

The method may comprise determining an attention parameter in dependence on the one or more characteristics of the occupant's gaze.

The attention parameter may comprise a measurement of a perceptual load of the occupant when engaging with the non-driving task. In some embodiments the attention parameter comprises a relative measurement of a perceptual load of the occupant when engaging with the non-driving task. For example, the method may comprise categorizing a measured perceptual load of the occupant into two or more categories, e.g. high, medium and low. The method may comprise determining the transition profile in dependence on the category of measured perceptual load of the occupant engaging with the non-driving task.

The method may comprise receiving data indicative of a type of non-driving task being performed. In some embodiments, the method may comprise identifying the type of non-driving task being performed by the occupant in dependence on the received data. Optionally, the method comprises determining the attention parameter in dependence on the identified non-driving task.

The method may comprise receiving physiological sensor data indicative of a level of electrical activity of the occupant's brain. For example, the method may comprise receiving the physiological data from one or more EEG sensors. The EEG sensors may be worn by the occupant. Optionally, the method may comprise determining the attention parameter in dependence on the received physiological sensor data.

In some embodiments the method comprises generating and outputting a control signal comprising instructions for controlling one vehicle output devices for providing an audio, a visual, and/or a haptic transition indicator to the occupant, the one or more transition indicators notifying the occupant of an upcoming transition between the first and second driving modes. In such embodiments the method may comprise adjusting one or more of an intensity, volume and/or duration of the or each transition indicator in dependence on the one or more characteristics of the occupant's gaze. In embodiments, the method may comprise adjusting one or more of an intensity, volume and/or duration of the or each transition indicator in dependence on the determined attention parameter.

In some embodiments the transition profile comprises a time period within which a transition between the first and second driving modes is to occur. In such embodiments, the method may comprise adjusting the time period in dependence on the one or more characteristics of the occupant's gaze; and optionally in dependence on the determined attention parameter.

In some embodiments the transition profile comprises a transition position ahead of the vehicle at which the transition between the first and second driving modes will occur. In such embodiments the method may comprise adjusting the location of the transition position in dependence on the one or more characteristics of the occupant's gaze; and/ optionally in dependence on the determined attention parameter.

In some embodiments the method may comprise receiving an input signal indicative of a request to transition between driving modes. Optionally, the input signal may be received from a vehicle control module.

The first driving mode may be an autonomous driving mode. The second driving mode may be a manual driving mode, for example a driving mode requiring at least one manual occupant input to control the vehicle. In such embodiments, one or more controls of the vehicle, e.g. movement in a lateral or longitudinal direction, may be controlled autonomously when in the manual driving mode. In some embodiments both the first and second driving modes are autonomous driving modes, with the second driving mode requiring a higher level of occupant interaction with the vehicle than the first driving mode. For example, the second driving mode, whilst operating substantially autonomously, may require an occupant to be observing the driving environment (e.g. eyes on the road/track/path, etc.) and/or require occupant contact with one or more controls (e.g. hand(s) on steering wheel). In such embodiments, the first driving mode may require less or no occupant interaction in such fashions described herein.

In some embodiments the method comprises monitoring the occupant's response to the transition from the first driving mode to the second driving mode before and/or during the transition. The method may comprise outputting a further control signal to one or more vehicle systems to transfer the vehicle to a third driving mode, at any time before or during the transition from the first driving mode to the second driving mode, in dependence on the occupant's response to the transition not meeting one or more response criteria. For example, the method may comprise determining whether the occupant has reduced their level of interaction with the non-driving task, and/or increased their level of interaction with driving task (e.g. eyes on the road, hands on the steering wheel, etc.) in preparation for the transition between the driving modes of the vehicle. The one or more response criteria may comprise the occupant having eyes on the road/track/driving environment, the occupant having one or more hands on a steering wheel of the vehicle, and/or an attention level of the occupant to the non-driving task meeting a pre-determined threshold level, for example. The third driving mode may comprise controlling the vehicle to come to a stop, for example stop in lane, pull over to the side of the road and/or drive to a predetermined location (e.g. a lay-by).

According to an aspect of the disclosure there is provided computer software that, when executed, is arranged to perform a method as described herein.

According to an aspect of the disclosure there is provided a non-transitory, computer-readable storage medium storing instructions thereon that, when executed by one or more electronic processors, causes the one or more electronic processors to carry out a method as described herein.

Within the scope of this application it is expressly intended that the various aspects, embodiments, examples and alternatives set out in the preceding paragraphs, in the claims and/or in the following description and drawings, and in the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

One or more embodiments of the disclosure will now be described, by way of example only, with reference to the accompanying drawings, in which.

DETAILED DESCRIPTION

A control system, system, vehicle and method in accordance with embodiments of the present disclosure is described herein with reference to the accompanying Figures.

Figure 1:
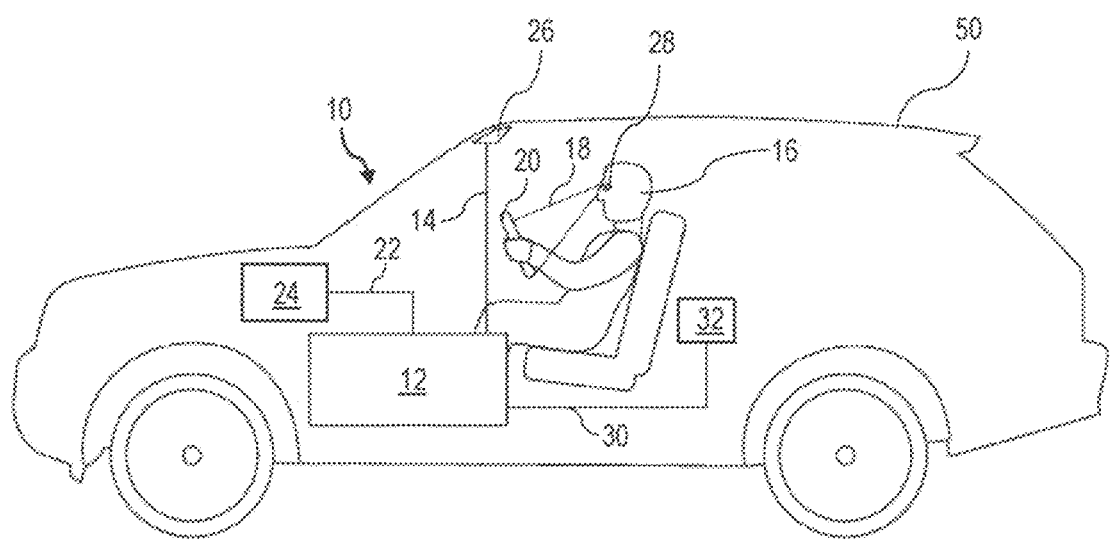
FIG. 1 shows a schematic representation of a vehicle comprising a control system in accordance with an embodiment of the present disclosure.

FIG. 1 shows a schematic representation of a vehicle 50 comprising a control system 10. The control system 10 is for controlling a transition between a first driving mode and a second driving mode of a vehicle, the second driving mode requiring a higher level of interaction from an occupant 16 of the vehicle 50 than the first driving mode. Control system 10 is configured to receive image data 14 of the occupant 16 of the vehicle 50. The image data 14 is received from a camera 26 within a cabin of the vehicle 50 (although it will be appreciated that the image data 14 may be received from multiple cameras). The control system 10 is configured to utilise the received image data 14 to quantify one or more characteristics of the occupant's gaze 18. The gaze 18 of the occupant 16 is able to be measured, monitored, and characteristics thereof quantified through processing of the image data 14 received from the camera 26. The one or more characteristics of the occupant's gaze 18 may be indicative of the occupant's attention to a non-driving task. In the illustrated example, the occupant 16 is interacting with a device 20.

The control system 10 is further configured to determine a transition profile for transitioning between the first driving mode and the second driving mode in dependence on the one or more characteristics of the occupant's gaze 18. As will be described in detail herein, the transition profile may comprise various adjustments of one or more vehicle systems 24 in order to ensure the attention level of the occupant 16 is at a level suitable for the second driving mode upon transition to that mode.

The control system 10 is further configured to generate and output a control signal 22 to transition from the first driving mode to the second driving mode; wherein the control signal 22 comprises instructions for controlling the one or more vehicle systems (exemplified by vehicle system 24) in accordance with the transition profile.

In embodiments such as that shown in FIG. 1, the control signal 22 comprises instructions for controlling one or more vehicle systems 24 in the form of vehicle output devices. The vehicle output devices can take the form of one or more audio output devices (e.g. speakers), displays and haptic motors within, on or otherwise associated with the vehicle 50. Such vehicle output devices are configured to provide an audio, a visual, and/or a haptic transition indicator to the occupant which can notify the occupant of an upcoming transition between the first and second driving modes.

The control system 10 can instruct such systems via control signal 22 to adjust one or more of an intensity, volume and/or duration of the or each transition indicator based on the attention level (inferred or determined as described herein) of the occupant to the non-driving task. For instance, the transition indicator(s) can be adjusted in a way such that occupants showing a high level of engagement with a non-driving task receive increased intensity alerts/indicators to bring their attention back to a driving task. The transition indicator(s) can be reduced in intensity where an occupant has a low level of engagement with a non-driving task, e.g. to prevent occupant annoyance.

Where audio output devices are used, the transition indicator can take the form of audible indicators such as audible tones, audio clips or spoken words, for example. In adjusting the audible indicator, the volume of the indicator can be adjusted, the duration of the indicator can be adjusted, the perceived urgency in any spoken words can be adjusted as required. Where visual output devices are used, the transition indicator can take the form of symbols, words, or other visual indicators to be displayed on one or more displays within the vehicle 50. In adjusting the visual indicators, the size shape, colour, shading, position, display etc. of the visual indicator may be adjusted, for example. Where haptic output devices are used, the transition indicator can comprise haptic indicators in the form of vibrations provided a haptic motor associated with one or more vehicle components. In adjusting the haptic indicators, the amplitude, frequency, duration, location etc. of the indicator may be adjusted, for example.

In embodiments, in determining the transition profile, the control system 10 is configured to determine a time period within which a transition between the first and second driving modes is to occur. In this way, the control system 10 is configured to tailor the transition profile in accordance with the occupant's engagement with a non-driving task. For example, more time may be required to increase engagement of an occupant with a driving task where the occupant is showing a high attention level to a non-driving task when compared with an occupant showing a lower attention level to the non-driving task. Adjusting the time period allows for the timing of the transition to concur with the time taken to increase the occupant's engagement with a driving task.

In embodiments, in determining the transition profile, the control system 10 is configured to determine a transition position ahead of the vehicle at which the transition between the first and second driving modes will occur. This could be an absolute position (e.g. GNSS coordinate, road position, map position etc.), or could be a position at a certain distance ahead of the vehicle. Adjusting the location of a transition position ahead of the vehicle allows for the timing of the transition to concur with the time taken, and hence the distance travelled by the vehicle, to increase the occupant's engagement with a driving task.

In the illustrated embodiment, the control system 10 is further configured to receive data 30 from one or more sensors (exemplified by sensor 32). The received data 30 is used by the control system 10 to identify a type of non-driving task being performed by the occupant 16. For example, analysis of image data may determine that the occupant is reading a book, or interacting with a tablet. This information, along with the one or more characteristics of the occupant's gaze 18 can be used to determine the transition profile. For example, the occupant may exhibit different characteristics when performing different tasks. Additionally or alternatively, a suitable transition profile may differ depending on the type of task being performed—the occupant may need more time to respond to a transition request if they are interacting with a tablet compared with reading a book, for instance.

In alternative embodiments, the control system 10 is further configured to receive data 30 in the form of physiological sensor data from one or more sensors 32. For example, the sensor(s) can comprise an EEG sensor for monitoring activity of an occupant's brain. In such embodiments, the control system 10 is configured to use the physiological sensor data to determine the attention parameter. For example, the control system 10 can use the physiological sensor data to supplement the analysis of the received image data in determining the attention parameter as described herein.

In embodiments, the control system 10 is configured to monitor an occupant's response to a transition between driving modes. This monitoring can occur before and/or during the transition and is generally performed through analysis of sensor data. The sensor data may include the image data from which the one or more gaze characteristics are quantified. The control system 10 is configured to compare the occupant's response to one or more response criteria. This can include assessing whether the occupant has reduced their level of interaction with the non-driving task, and/or increased their level of interaction with driving task. For example, does the occupant have their eyes on the road, are their hands on the steering wheel, etc. The control system 10 can, for example, be configured to determine whether an attention level of the occupant to the non-driving task meeting a pre-determined threshold level—e.g. where categorisation of an attention level has taken place, assessing whether the occupant's attention level to the non-driving task been determined as "low".

If the occupant's response does meet the response criteria, the control system 10 is configured to continue the transition to the second driving mode. However, if the occupant's response does not meet the response criteria—e.g. the occupant has not sufficiently reduced his/her attention level to a non-driving task—the control system 10 can output a further control signal to transfer the vehicle 50 to a third driving mode. This may be performed at any time before or during the transition from the first driving mode to the second driving mode. In the third driving mode, the vehicle may be brought to a stop, for example stop in lane, pull over to the side of the road and/or drive to a predetermined location (e.g. a lay-by).

Figure 2:
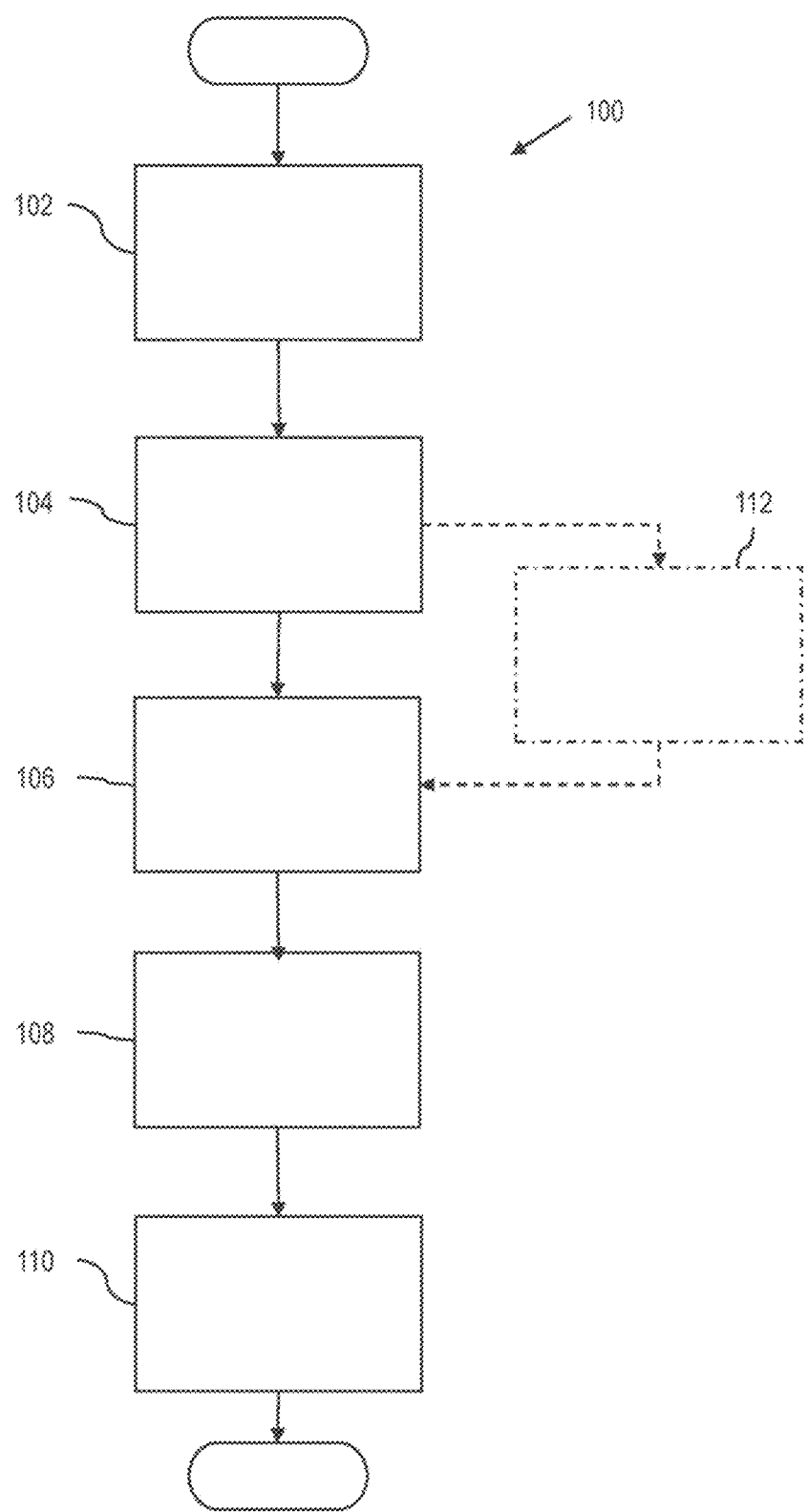
FIG. 2 shows a flow chart illustrating an embodiment of a method of the disclosure.

FIG. 2 illustrates an embodiment of a method 100 of the present disclosure.

At step 102, the method 100 comprises receiving image data. As discussed herein, the image data may be received from one or more cameras located within the vehicle.

At step 104, one or more characteristics of the occupant's gaze are quantified. The one or more characteristics can include a gaze direction, gaze duration on a target, saccade direction, a saccade duration, and/or a saccade direction. Each of these gaze characteristics are quantified to infer an attention level of the occupant to a non-driving task.

Optionally, at step 112, an attention parameter is determined in dependence on the quantified characteristic(s). In embodiments, the method 100 includes categorising an attention level of the occupant on the basis of the quantified characteristic(s). For example, the method 100 can include assigning a category, e.g. high attention/low attention, based on the quantified/observed characteristic(s). There may be an associated transition profile for each category.

At step 106, a transition profile for transitioning the vehicle from the first driving mode to the second driving mode is determined. As shown, this is dependent on the quantified characteristic(s) of the occupant's gaze, and optionally on a determined attention parameter.

The illustrated method concludes with generating (step 108) and outputting (step 110) a control signal to transition from the first driving mode to the second driving mode. The control signal comprises instructions for controlling one or more vehicle systems in accordance with the determined transition profile, as is described herein.

Figure 3:
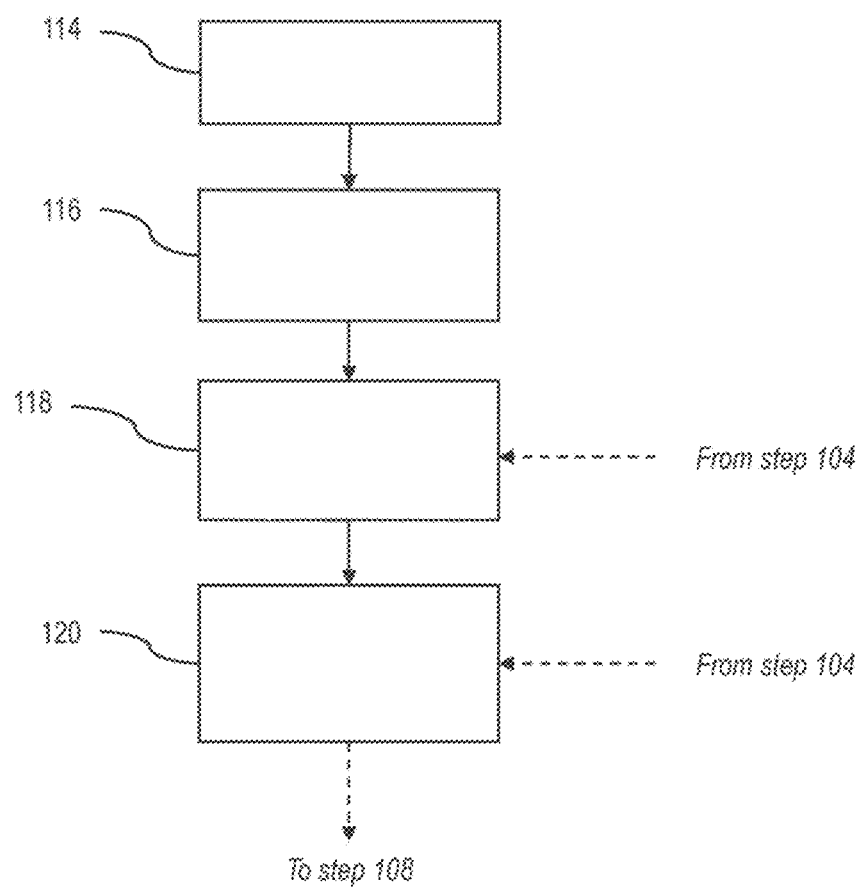
FIG. 3 shows a flow chart illustrating an embodiment of a method of the disclosure.

FIG. 3 illustrates an embodiment of a method which is an extension of the method 100 shown in FIG. 2.

At step 114, the method comprises receiving data indicative of a type of non-driving task being performed. As is described herein, the received data may comprise data indicative of use of a vehicle system, may be indicative of occupant interaction with a mobile device, or may comprise sensor data, such as image data of the occupant.

At 116, the type of non-driving task being performed by the occupant is determined in dependence on the received data. For example, the type of non-driving task could be determined as reading a book, or interacting with a mobile device such as a smartphone or tablet.

At 118, the attention parameter is determined in dependence on the identified non-driving task, and at step 120, the transition profile is determined 120 in dependence on the attention parameter. As shown in FIG. 3, the one or more characteristics of the occupant's gaze, quantified in step 104 of method 100 may be used in the method of FIG. 3 to perform step 118 or step 120—i.e. the one or more quantified characteristics may be used to determine the attention parameter (and use the determined attention parameter to determine the transition profile), or, the one or more quantified characteristics may be used alongside the attention parameter to determine the transition profile directly.

Figure 4:
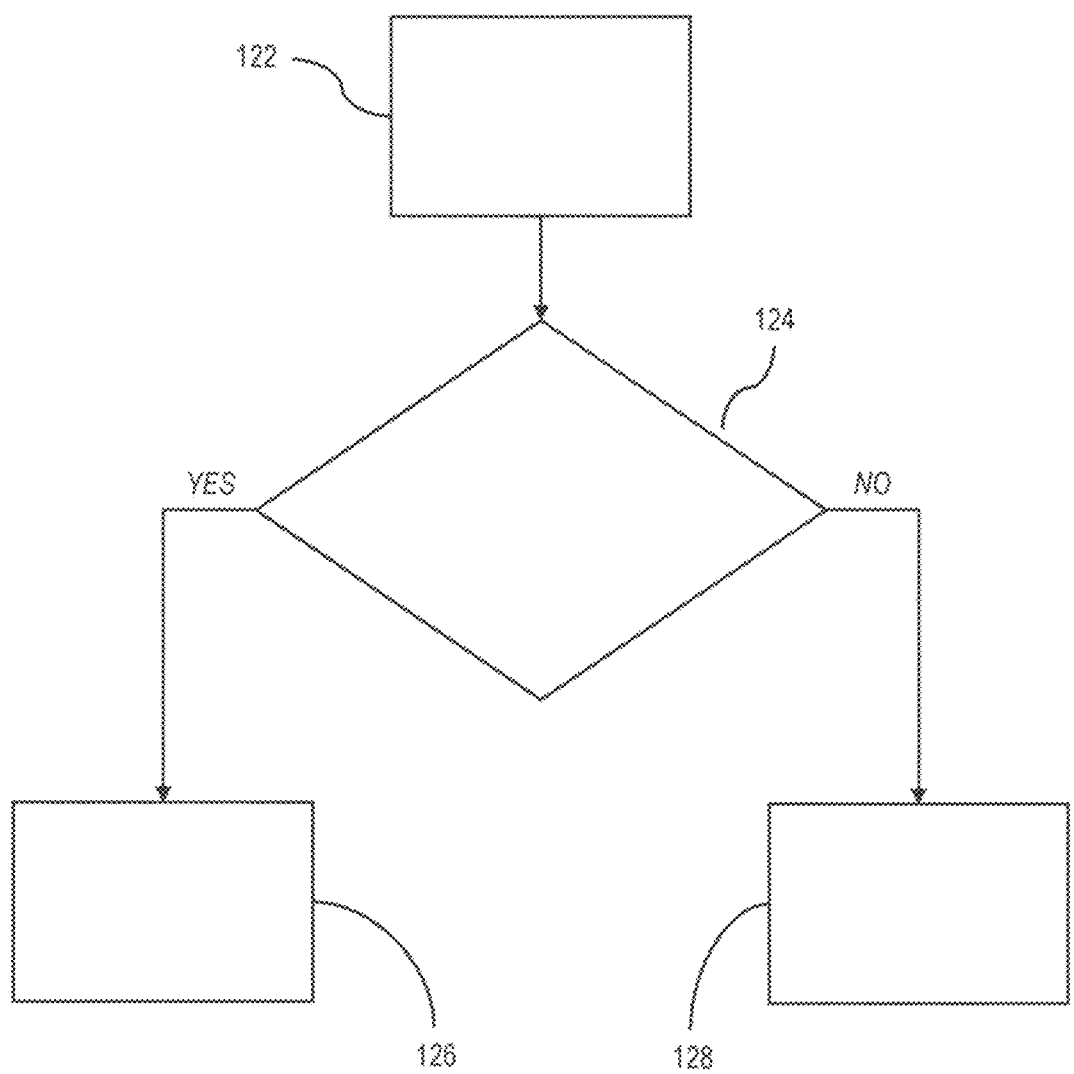
FIG. 4 shows a flow chart illustrating an embodiment of a method of the disclosure.

FIG. 4 illustrates an embodiment of a method which is a further extension of the method 100 shown in FIG. 2.

In step 122, the method comprises monitoring an occupant's response to a transition between driving modes. As described herein, the monitoring can occur before and/or during the transition and may be performed through analysis of sensor data, which may include the image data.

At step 124, the occupant's response is compared to one or more response criteria. In assessing whether the occupant's response meets the one or more response criteria the method can determine whether the occupant has reduced their level of interaction with the non-driving task, and/or increased their level of interaction with driving task (e.g. eyes on the road, hands on the steering wheel, etc.) in preparation for the transition between the driving modes of the vehicle. For instance, the one or more response criteria can comprise the occupant having eyes on the road/track/driving environment, the occupant having one or more hands on a steering wheel of the vehicle, and/or an attention level of the occupant to the non-driving task meeting a pre-determined threshold level.

If the occupant's response does meet the response criteria, the method proceeds to step 126 in which the transition to the second driving mode continues. However, if the occupant's response does not meet the response criteria—e.g. the occupant has not sufficiently reduced his/her attention level to a non-driving task—the method proceeds to step 128 in which the vehicle is transferred to a third driving mode. As described herein, the transfer to the third driving mode may be performed at any time before or during the transition from the first driving mode to the second driving mode. In the third driving mode, the vehicle may be brought to a stop, for example stop in lane, pull over to the side of the road and/or drive to a predetermined location (e.g. a lay-by).

Figure 5:
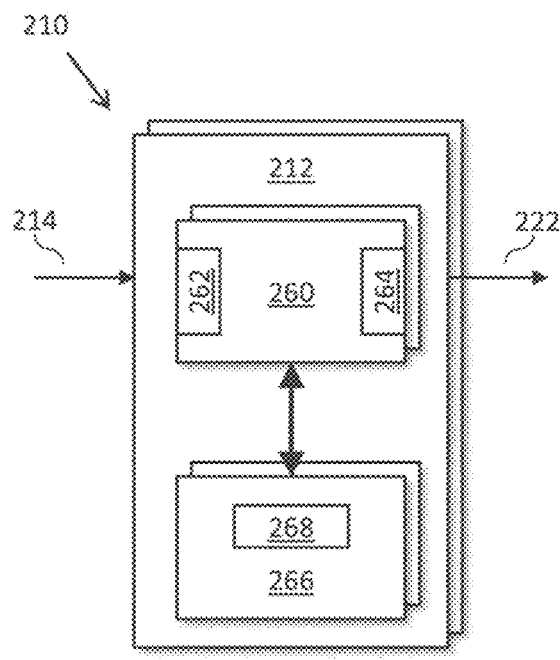
FIG. 5 shows a simplified example of a control system such as may be adapted in accordance with an embodiment of the disclosure.

With reference to FIG. 5, there is illustrated a simplified example of a control system 210 such as may be adapted to implement the methods described above.

The control system 210 comprises one or more controllers 212 and is configured to receive image data 14 of the occupant 16 of the vehicle 50; quantify one or more characteristics of the occupant's gaze 18 in dependence on the received image data 14, the one or more characteristics being indicative of the occupant's attention to a non-driving task (e.g. interaction with device 20); determine a transition profile for transitioning between the first driving mode and the second driving mode in dependence on the one or more characteristics of the occupant's gaze 18; and generate and output a control signal 22 to transition from the first driving mode to the second driving mode; wherein the control signal 22 comprises instructions for controlling one or more vehicle systems 24 in accordance with the transition profile.

It is to be understood that the or each controller 212 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 212 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 212 to implement the control techniques described herein (including some or all of the functionality required for the methods described herein). The set of instructions could be embedded in said one or more electronic processors of the controller 212; or alternatively, the set of instructions could be provided as software to be executed in the controller 212. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 5, the or each controller 212 comprises at least one electronic processor 260 having one or more electrical input(s) 262 for receiving one or more input signals 214 which, in embodiments comprises image data 14, and one or more electrical output(s) 264 for outputting one or more (output signal(s) 222, which in embodiments comprises the control signal 22. The or each controller 212 further comprises at least one memory device 266 electrically coupled to the at least one electronic processor 260 and having instructions 268 stored therein. The at least one electronic processor 260 is configured to access the at least one memory device 266 and execute the instructions 268 thereon so as to determine and output the control signal 22 to the one or more vehicle systems (e.g. vehicle system 24).

The, or each, electronic processor 260 may comprise any suitable electronic processor (e.g., a microprocessor, a microcontroller, an ASIC, etc.) that is configured to execute electronic instructions. The, or each, electronic memory device 266 may comprise any suitable memory device and may store a variety of data, information, threshold value(s), lookup tables or other data structures, and/or instructions therein or thereon. In an embodiment, the memory device 266 has information and instructions for software, firmware, programs, algorithms, scripts, applications, etc. stored therein or thereon that may govern all or part of the methodology described herein. The processor, or each, electronic processor 260 may access the memory device 266 and execute and/or use that or those instructions and information to carry out or perform some or all of the functionality and methodology describe herein.

The at least one memory device 266 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 212 have been described comprising at least one electronic processor 260 configured to execute electronic instructions stored within at least one memory device 266, which when executed causes the electronic processor(s) 260 to carry out methods as hereinbefore described. However, it is contemplated that the present disclosure is not limited to being implemented by way of programmable processing devices, and that at least some of, and in some embodiments all of, the functionality and or method steps of the present disclosure may equally be implemented by way of non-programmable hardware, such as by way of non-programmable ASIC, Boolean logic circuitry, etc.

The present disclosure as described herein utilises results obtained through validation studies (Validation Studies 1-3 detailed below) of the effect of load on both eye movements and response times when performing a test task.

It has been shown in Validation Studies 1-3 that a perceptual load experienced by a person interacting with a non-driving task (e.g. reading a book, browsing the internet on a mobile device such as a tablet, etc.) can be inferred through analysis of an occupant's gaze. Accordingly, quantifying one or more characteristics of an occupant's gaze may allow for a determination of a level of attention the occupant is paying to the non-driving task. If the occupant is highly engaged with the non-driving task it is proposed that this will require a different control strategy for transferring control of the vehicle back to the occupant than if the occupant was paying less attention to the non-driving task.

For example, for occupant's performing a search task—e.g. browsing the internet on a smart device—it has been shown in Validation Studies 1-3 that an occupant under low load generally tends to exhibit a lower peak saccade velocity when compared with an occupant under a higher load. Furthermore, in the same scenario, it has been shown that an occupant under low load generally tends to exhibit a greater saccade length when compared with an occupant under a higher load. In addition, in the same scenario, an occupant under low load generally tends to exhibit a greater saccade duration when compared with an occupant under a higher load. This information is utilised in the present disclosure to infer from quantified gaze characteristics of a monitored occupant a level of load the occupant is experiencing.

It has also been shown in Validation Studies 1-3 that an occupant under a higher load takes longer to respond to audible indicators external to the task they are performing when compared with an occupant under a lower load. Accordingly, the present disclosure may utilise this information to inform determination of a transition profile—e.g. where it is determined that the occupant is under a high load, a more intense/louder audible indication may be required; and/or it may need to be provided earlier in the transition to allow time for the occupant to respond thereto.

It will be appreciated that various changes and modifications can be made to the present disclosure without departing from the scope of the present application.

Validation Study 1

Participants

Twenty participants completed this experiment (14 females, mean age=23.35 years, SD=2.98 years). Participants were recruited from the UCL Institute of Cognitive Neuroscience subject mailing list and were compensated for their time at a rate of £7.50 per hour. Participants had normal hearing and normal vision (no glasses or contact lenses, as these interfere with the functioning of the eye-tracker) with no self-reported colour vision deficiency or astigmatism. The experiment was approved by the UCL Research Ethics Committee.

Apparatus and Stimuli

The experiment was programmed with the psychtoolbox extension (cite) for Matlab, run on a computer running the Windows 10 operating system. Visual stimuli were presented on a Dell S2417DG 23.8-inch LED monitor with a display resolution of 1920×1980 pixels and a 60 Hz refresh rate, placed 66.5 cm from the participant. Manual responses were collected with a standard USB keyboard. Auditory stimuli were presented via a pair of Sennheiser HD 598 headphones connected to an RME Fireface UC sound card. Eye movements were recorded with an Eyelink 1000 Plus video-based infrared eye-tracker, sampling monocularly from the right eye at 500 Hz. Participants rested their chin in a chinrest with their forehead touching a padded forehead bar attached to the chinrest. The experiment was run in a dimly lit room.

Figure 6:
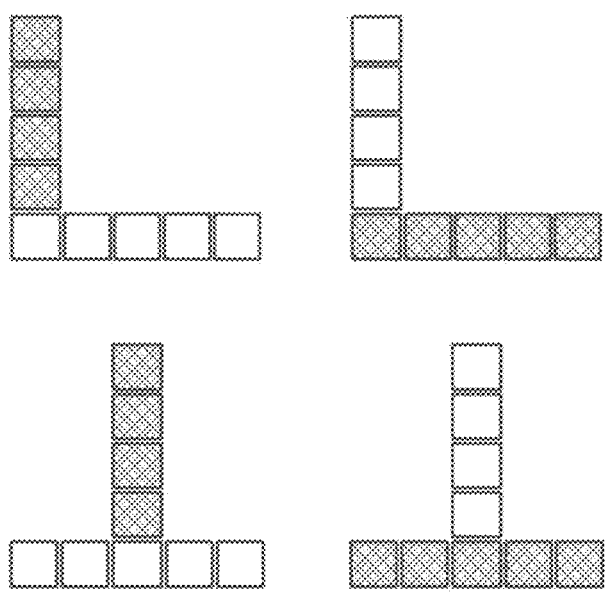
FIG. 6 illustrates example search stimuli used in experimental validation of the disclosure.

Search stimuli were presented on a grey background. Prior to the appearance of the search display, a fixation display was presented which consisted of the grey background with a small black fixation cross. Upon appearance of the search display the fixation cross disappeared. The search stimuli were Ls and upside down Ts, each roughly 0.7×0.7°, and made up of five small squares of the same colour (blue or green) in the horizontal portion, and four small squares of the other colour in the vertical portion of the shape (as shown in FIG. 6). There were 20 stimuli in each search display: 5 Ls with green horizontal and blue vertical portions, 5 Ls with blue horizontal and green vertical portions, 5 Ts with green horizontal and blue vertical portions, and 5 Ts with blue horizontal and green vertical portions.

Visual search stimuli were presented within a central 32°×24° region of the display so as to conform to the accurate trackable range of the eye-tracker. On each trial, stimuli were allocated randomly to positions of a 10×7 grid, with centre locations separated by roughly 3°. Each stimulus then had its vertical and horizontal position jittered by up to 0.5° to reduce the collinearity of stimuli in the same row or column.

On trials in which tones were presented, the tone was a quiet but audible (~38.6 dB) 400 Hz pure tone with a duration of 50 ms.

Procedure

Informed consent was obtained from the participants prior to the experiment. The participants had an opportunity to hear the tone before the start of the experiment to indicate whether they could hear it. The participants took part in the study only if they were able to hear the tone.

Participants were given written and verbal instructions on how to perform the task. In the experiment, participants performed a visual search task in which they searched for targets of two predefined types that differed between two load conditions. In the low load condition, the targets were the two L shapes, so search could be completed on the basis of shape alone. In the high load condition targets were defined by conjunctions of shape and colour; they were the L with the green horizontal and blue vertical sections, and the upside down T with the blue horizontal and green vertical sections. There were 10 targets per display, 5 of each type. Participants first completed two practice blocks of 6 trials, one block of each load level, in counterbalanced order.

Each block began with an instructions screen, informing the participants which stimuli were the targets and which were the nontargets for that block. Participants were encouraged to look at the stimuli until they felt confident they would remember which their targets were. They then began the block with a keypress. Each block began with the eye-tracker's standard 9-point calibration procedure. Once a suitable calibration had been achieved, the task began. Blocks contained 36 trials each of the same load level. Participants performed 8 blocks of trials in counterbalanced order; either LHHLHLLH or HLLHLHHL, where L indicates a low load block and H indicates a high load block.

Each trial began with a fixation display, in which participants were required to fixate within 0.5 of the centre of the central fixation cross. The search display was presented once participants had fixated within 0.5° of the centre of a central fixation cross for 500 ms, unbroken by blinks or eye movements. If 3 seconds passed without this criterion being reached participants were calibrated anew, and the trial began again with the fixation control procedure.

Once the search array appeared, participants were required to find as many targets as possible within the 7 second duration of the trial. Participants moved their eyes around the display, and once a target was found they were required to fixate within 0.95° of the target for 500 ms, unbroken by blinks or eye movements, upon which time the target would disappear from the display and the participant could continue their search to find more targets. Target fixations were required to be 500 ms as this duration is significantly longer than the average duration of a fixation (roughly 250 ms), ensuring targets would not disappear if participants simply moved their eyes through the display randomly without performing the search (this was confirmed during pilot testing). Extended fixation upon distractors did not cause them to disappear. At the end of the trial the search array disappeared and the next trial would begin with the fixation control.

On 50% of trials, a tone was presented via the headphones. Tones were controlled to appear at each of 18 linearly spaced times between 2 and 5 seconds in each block. Upon hearing the tone, participants were required to abort their search and press the spacebar as quickly as possible. Participants were instructed to rest their dominant hand on the spacebar throughout the task. The trial ended as soon as the spacebar was pressed, or after 7 seconds from the beginning of the trial, if no response was made.

A self-paced break occurred at the end of each block. Participants were given no feedback about their performance on either the search or tone tasks.

Eye-Tracking Parameters

For the eye-tracking analyses, saccades were defined with standard parameters, as eye movements with a velocity greater than 30°/s or an acceleration greater than 8000°/s$^2$. Fixations were defined as any time in which the pupil was visible and a saccade was not being made. Blinks, defined as periods in which the pupil was not visible, were removed from the analysis with their associated pre-blink and post-blink saccades (caused by rapid occlusion of the pupil being interpreted by the eye tracker as a saccade).

Results

Tone Detection

Tone RT was compared between Low versus High Load Search with a repeated-measures t-test. This revealed that tone reaction times were significantly faster when participants performed a low load search (M=549 ms) than when they performed a high load search (M=587 ms), t(19)=4.60, p<0.001, Cohen's D=0.34.

A 2-way repeated-measures ANOVA on participants reaction times to the tone, with the factors Load Level (Low, High) and Tone Time (During Fixation, During Saccade) revealed a significant main effect of Load Level, $F(1,19)=13.34$, p=0.002, $\eta^2=0.41$, such that tones were reported significantly more quickly in the low load condition than the high load condition, as reported above. The main effect of Tone Time was not significant, $F(1,19)=1.15$, p=0.297, $\eta^2=0.06$, nor was the interaction between Load Level and Tone Time, $F(1, 19)=0.01$, p=0.931, $\eta^2<0.01$. Planned follow-up comparisons revealed that tones occurring during fixations were responded to significantly more quickly when participants performed a low load search (M=551 ms) than when they performed a high load search (M=587 ms), t(19)=4.02, p<0.001, Cohen's D=0.33. Tones occurring during saccades trended towards faster responses when they occurred during low load search (M=541 ms) than when they occurred during high load search (M=579 ms), t(19)=1.96, p=0.065, Cohen's D=0.33, however as tones were presented at random times and the majority of search time is made up of fixations, there were very few tones that occurred during saccades (Low load M=5.90, High load M=6.75), rendering this analysis underpowered. Experiment two was performed to follow-up this result.

Search Performance

Participants found significantly fewer targets in high load search (M=5.33) than low load search (M=7.14), t(19)=27.18, p<0.001, Cohen's D=4.25, and there were significantly more fixations on nontargets under high load (M=6.11) than under low load (M=3.35), t(19)=24.41, p<0.001, Cohen's D=4.10

Eye Movement Parameters

Several eye-movement parameters were examined for differences between high and low load. Participants fixated nontargets significantly longer under high load (M=325 ms) than under low load (M=222 ms), t(19)=11.73, p<0.001, Cohen's D=2.83. There was no significant difference between low and high load in the average duration of saccades (Low M=41 ms, High M=41 ms), t(19)=1.67, p=0.111, Cohen's D=0.24. The same result was observed when comparing the length of saccades (in degrees of visual angle) between low and high load searches (Low M=4.93°, High M=4.85°), t(19)=1.11, p=0.283, Cohen's D=0.25. Saccades did, however, reach significantly higher peak velocities under high load (M=253°/s) than under low load (M=245°/s), t(19)=3.03, p=0.007, Cohen's D=0.19.

To examine whether saccade velocities depended on whether a participant was making a saccade to a target or a nontarget, we ran a 2-way repeated-measures ANOVA on saccade peak velocity, with the factors Load Level (Low, High) and Saccade Destination (Target, Nontarget). This revealed a trend towards a significant main effect of Load Level, $F(1,19)=4.25$, p=0.053, $\eta^2=0.18$, a significant main effect of Saccade Destination, $F(1,19)=17.31$, p<0.001, $\eta^2=0.48$, and a significant Load Level×Saccade Destination interaction, $F(1,19)=38.52$, p<0.001, $\eta^2=0.67$. The significant interaction was followed up by paired samples t-tests. Under low load, saccades were significantly slower when approaching a target (M=244°/s) than when approaching a nontarget (M=256°/s), t(19)=6.07, p<0.001, Cohen's D=1.36. There was no difference, however, between saccade peak velocities approaching targets (M=255°/s) and nontargets (M=256°/s) under high load, t(19)=0.45, p=0.659, Cohen's D=0.10.

The same analysis was performed on saccade velocities for eye movements departing a target versus a distractor. A 2-way repeated-measures ANOVA on saccade peak velocity, with the factors Load Level (Low, High) and Saccade Origin (Target, Nontarget) revealed a significant main effect of Load Level, $F(1,19)=4.67$, p=0.043, $\eta^2=0.20$, and a significant main effect of Saccade Destination, $F(1,21)=68.89$, p<0.001, $\eta^2=0.78$. There was no significant interaction between Load Level and Saccade Destination, $F(1,19)=0.41$, p=0.529, $\eta^2=0.02$. Saccade velocities were higher under high versus low load, and when departing a nontarget versus a target (Low load, departing target: M=244°/s; Low load, departing nontarget: M=260°/s; High load, departing target, M=250°/s; High load, departing nontarget, M=264°/s).

Validation Study 2

Participants

Twenty-two new participants took part in Experiment 2 (14 females, mean age 22.41 years, SD=4.06 years). Participants were recruited from the UCL Institute of Cognitive Neuroscience subject mailing list and were compensated for their time at a rate of £7.50 per hour. Participants had normal hearing and normal vision (no glasses or contact lenses, as these interfere with the functioning of the eye-tracker) with no self-reported colour vision deficiency or astigmatism. The experiment was approved by the UCL Research Ethics Committee.

Apparatus and Stimuli

The apparatus was identical to Experiment 1. The stimuli were identical to Experiment 1 with the following exceptions: In order to drive more non-target fixations, the number of targets in each display was reduced to 4 (2 of each target type; the mapping of stimuli to conditions was unchanged from Experiment 1) and the number of nontargets in each display was increased to 16 (8 of each nontarget type).

Procedure

The procedure was identical to Experiment 1 with the following exceptions: To correspond with the reduced number of targets, trials were shortened to a maximum of 3.5 seconds. We added a control such that 50% of tones began during a fixation, and 50% of tones began during a saccade (tones still occurred on 50% of trials overall). Tones on fixation-tone trials and saccade-tone trials were controlled to occur during the first fixation/saccade that occurred after a minimum period of time had elapsed. The minimum periods of time used in each block were 9 linearly spaced times between 0.5 and 2.5 seconds into the trial, presented in random order separately for fixation- and saccade-tone trials.

Eye-Tracking Parameters

The eye-tracking parameters were identical to those used in Experiment 1.

Results

Tone Detection

A 2-way repeated-measures ANOVA on participants reaction times to the tone, with the factors Load Level (Low, High) and Tone Time (During Fixation, During Saccade) revealed a significant main effect of Load Level, $F(1,21)=7.95$, p=0.010, $\eta^2=0.28$, such that tones were reported significantly more quickly in the low load condition (M=554 ms) than the high load condition (M=600 ms). The main effect of Tone Time approached significance, $F(1,21)=4.23$, p=0.052, $\eta^2=0.17$, with shorter reaction times when tones were presented during a saccade (M=568 ms) than when they were presented during a fixation (M=585 ms). There was no significant interaction between Load Level and Tone Time, $F(1, 21)=1.00$, p=0.329, $\eta^2=0.05$.

To further examine the effect of load on tone detection when participants were making a fixation we performed a 2-way repeated-measures ANOVA on participants reaction times to the tone, with the factors Load Level (Low, High) and Tone Time (During Target Fixation, During Nontarget Fixation). This revealed a significant main effect of Load Level, $F(1,21)=5.46$, p=0.029, $\eta^2=0.21$, such that tones were reported significantly more quickly in the low load condition (M=562 ms) than the high load condition (M=607 ms). There was a significant main effect of Tone Time, $F(1,21)=7.16$, p=0.014, $\eta^2=0.25$, with shorter reaction times when tones were presented during nontarget fixation (M=574 ms) than when they were presented target fixation (M=594 ms). There was no significant interaction between Load Level and Tone Time, $F(1, 21)=0.05$, p=0.824, $\eta^2<0.01$.

Search Performance

Significantly fewer targets were found in high load search (M=1.58) than low load search (M=2.40), t(21)=21.27, p<0.001, Cohen's D=4.55. There were also significantly more fixations on nontargets under high load (M=4.24) than under low load (M=3.01), t(21)=9.33, p<0.001, Cohen's D=2.27

Eye Movement Parameters

An analysis of nontarget fixation duration revealed that participants fixated nontargets significantly longer under high load (M=254 ms) than under low load (M=195 ms), t(21)=12.19, p<0.001, Cohen's D=2.10. There was no significant difference between low and high load in the average duration of saccades (Low M=42 ms, High M=43 ms), t(21)=0.62, p=0.539, Cohen's D=0.15. Saccades were longer on average under low load (M=5.43°) than under high load (M=4.91°), t(21)=7.36, p<0.001, Cohen's D=0.94. Saccades trended towards higher peak velocities under low load (M=255° is) than under high load (M=251°/s), t(21)=1.97, p=0.062, Cohen's D=0.10.

When examining saccade peak velocity for saccades approaching a target versus a nontarget, a 2-way repeated-measures ANOVA with the factors Load Level (Low, High) and Saccade Destination (Target, Nontarget) revealed a significant main effect of Load Level, $F(1,21)=56.48$, p<0.001, $\eta^2=0.73$, a significant main effect of Saccade Destination, $F(1,21)=6.75$, p=0.017, $\eta^2=0.24$, and a significant interaction between Load Level and Saccade Destination, $F(1,21)=12.83$, p=0.002, $\eta^2=0.38$. The significant interaction was followed up by paired samples t-tests. Under low load, there was no significant difference between the peak velocity of saccades approaching a target (M=252°/s) and saccades approaching a nontarget (M=250°/s), t(21)=0.89, p=0.382, Cohen's D=0.19. Under high load, however, saccade peak velocities were significantly higher when approaching targets (M=265°/s) than when approaching nontargets (M=255°/s), t(21)=3.31, p=0.003, Cohen's D=0.71.

Saccade peak velocities for saccades departing targets versus nontargets were analysed with a 2-way repeated-measures ANOVA, with the factors Load Level (Low, High) and Saccade Origin (Target, Nontarget). This analysis revealed an effect of Load Level that approached significance, $F(1,21)=3.56$, p=0.073, $\eta^2=0.15$, and a significant main effect of Saccade Destination, $F(1,21)=7.23$, p=0.014, $\eta^2=0.26$. There was no significant interaction between Load Level and Saccade Destination, $F(1,21)=1.06$, p=0.314, $\eta^2=0.05$. Saccade velocities towards higher maximums under high versus low load, and were lower when departing a nontarget versus a target (Low load, departing target: M=262°/s; Low load, departing nontarget: M=257°/s; High load, departing target, M=267°/s; High load, departing nontarget, M=260°/s).

Validation Study 3

Participants

Twenty-four new participants competed Experiment 3 (12 female, mean age=23.38 years, SD=5.07 years).). Participants were recruited from the UCL Institute of Cognitive Neuroscience subject mailing list and were compensated for their time at a rate of £7.50 per hour. Participants had normal hearing and normal vision (no glasses or contact lenses, as these interfere with the functioning of the eye-tracker) with no self-reported colour vision deficiency or astigmatism. The experiment was approved by the UCL Research Ethics Committee.

Apparatus and Stimuli

The apparatus and stimuli were identical to those used in Experiment 2.

Procedure

The procedure was identical to Experiment 2.

Eye-Tracking Parameters

The eye-tracking parameters were identical to the previous experiments.

EEG Recording

Continuous EEG data were recorded using an Active Two system (BioSemi) digitized at 1024 Hz with 24-bit A/D conversion. Fifty-seven active scalp Ag/AgCl electrodes were arranged in a nylon head cap according to the international standard 10-10 system for electrode placement (Oostenveld and Praamstra, 2001), but excluding electrodes[ ] as these electrodes would have caused the participant discomfort if pressed against the eye-tracker's forehead rest. As per the BioSemi system design, the Common Mode Sense and Driven Right Leg electrodes served as the ground and all scalp electrodes were referenced to the Common Mode Sense electrode during recording. In addition to monitoring eye-movements with the eye-tracker, we also recorded bipolar horizontal EOG with electrodes placed at the outer canthi of each eye and bipolar vertical EOG with electrodes placed above and below the left eye. Data from left and right mastoids was also collected.

EEG Analysis

Offline EEG data analysis was performed using EEGLAB (Delorme & Makeig, 2004) and custom MATLAB scripts (except where noted). EEG data were first referenced to the average of the left and right mastoids. Eye-movements were co-registered to the EEG data with the EYE-EEG plugin for EEGLAB (Dimigen et al., 2011) and ocular artifacts were removed using the optimised ICA training procedure (OPTICAT; Dimigen, 2018) which over-weights saccade periods in the ICA training data, and selects independent components for rejection based on the variance ratio of saccade periods relative to fixation periods (Plöchl et al., 2012). Further artefactual components related to muscle activity, line noise, etc. were identified and removed using a combination of visual inspection and the SASICA plugin for EEGLAB (Chaumon et al., 2015) which incorporates methods from the ADJUST (Mognon et al., 2011) and FASTER (Nolan et al., 2010) plugins. Following artefact rejection, bad channels were identified using an automated procedure that rejects channels whose kurtosis exceeds 5 standard deviations from the mean of all channels. Bad channels had their data replaced using a spherical spline interpolation from the voltages of all other scalp electrodes.

For the fERP analysis, the data were epoched from −200 ms to +800 ms around the onset of each fixation, excluding any fixations that did not begin and end within the trial period, and any fixations within T of a target. Epochs were then rereferenced to the average of all scalp electrodes and baseline corrected relative to the period from −200 ms to −100 ms. Epochs in which the EEG exceeded −100 µV or +100 µV were identified and rejected from analysis using an automated procedure. Epochs for analysis were then selected using an iterative Mahalanobis distance procedure, matching epochs between high and low load conditions on fixation duration and the length of the previous saccade (Kamienkowski et al., 2012; Nikolaev et al., 2016). fERPs were then calculated by averaging the resulting data epochs separately for the high- and low-load search conditions.

For time-frequency analysis, the same fixations selected for the fERP analysis were re-epoched between −2000 ms and +3000 ms from the cleaned continuous data and were re-referenced to the average of all scalp electrodes. The data from these epochs were then decomposed into oscillatory time-series by means of complex Morlet wavelets (Tallon-Baudry & Bertrand, 1999) at frequencies from 1 Hz to 20 Hz in 1 Hz steps and from 22 to 60 Hz in 2 Hz steps, with the number of wavelet cycles linearly spaced from 4 to 10 cycles across frequencies. The amplitude envelope at each frequency was calculated as the absolute value of the resulting complex-number at each time point.

Results

Tone Detection

A 2-way repeated-measures ANOVA on participants reaction times to the tone, with the factors Load Level (Low, High) and Tone Time (During Fixation, During Saccade) revealed a significant main effect of Load Level, $F(1,23)=11.24$, $p=0.003$, $\eta^2=0.32$, such that tones were reported significantly more quickly in the low load condition (M=546 ms) than the high load condition (M=585 ms). The main effect of Tone Time was significant, $F(1,23)=16.23$, $p<0.001$, $\eta^2=0.40$, with shorter reaction times when tones were presented during a saccade (M=552 ms) than when they were presented during a fixation (M=580 ms). There was no significant interaction between Load Level and Tone Time, $F(1, 23)=0.27$, $p=0.609$, $\eta^2=0.01$.

Tone reaction times that occurred during fixation on a target versus a nontarget were examined with a 2-way repeated-measures ANOVA on participants reaction times to the tone, with the factors Load Level (Low, High) and Tone Time (During Target Fixation, During Nontarget Fixation). This analysis revealed a significant main effect of Load Level, $F(1,23)=4.86$, $p=0.037$, $\eta^2=0.17$, such that tones were reported significantly more quickly in the low load condition (M=568 ms) than the high load condition (M=595 ms). There was no significant main effect of Tone Time, $F(1,23)=1.38$, $p=0.252$, $\eta^2=0.05$, and no significant interaction between Load Level and Tone Time, $F(1, 23)=0.15$, $p=0.704$, $\eta^2<0.01$.

Search Performance

Significantly fewer targets were found in high load search (M=1.91) than low load search (M=2.78), $t(23)=17.45$, $p<0.001$, Cohen's D=4.66. However, there were significantly more fixations on nontargets under high load (M=5.19) than under low load (M=3.63), $t(23)=18.34$, $p<0.001$, Cohen's D=2.64.

Eye Movement Parameters

Participants fixated nontargets significantly longer under high load (M=222 ms) than under low load (M=184 ms), $t(23)=5.96$, $p<0.001$, Cohen's D=1.61. There was a significant difference between low and high load search in the average duration of saccades (Low M=40 ms, High M=39 ms), t(23)=3.20, p=0.004, Cohen's D=0.30. Saccades were longer on average under low load (M=5.56°) than under high load (M=5.26°), t(23)=3.96, p<0.001, Cohen's D=0.70. Finally, there was no difference between saccade peak velocities under low load (M=251°/s) compared to high load (M=251°/s), t(23)=0.17, p=0.864, Cohen's D=0.01.

A 2-way repeated-measures ANOVA on saccade peak velocity, with the factors Load Level (Low, High) and Saccade Destination (Target, Nontarget) revealed a significant main effect of Load Level, $F(1,23)=171.11$, $p<0.001$, $\eta^2=0.88$. There was no significant main effect of Saccade Destination, $F(1,23)=1.82$, $p=0.191$, $\eta^2=0.07$, however, there was a significant interaction between Load Level and Saccade Destination, $F(1,23)=37.26$, $p<0.001$, $\eta^2=0.62$. The significant interaction was followed up by paired samples t-tests. Under low load, saccade peak velocities were significantly lower for saccades approaching a target (M=242°/s) than for saccades approaching a nontarget (M=246°/s), t(23)=2.32, p=0.030, Cohen's D=0.47. Under high load, however, saccade peak velocities were significantly higher when approaching targets (M=268°/s) than when approaching nontargets (M=257°/s), t(23)=3.17, p=0.004, Cohen's D=0.65.

A 2-way repeated-measures ANOVA on saccade peak velocity departing a target versus a nontarget, with the factors Load Level (Low, High) and Saccade Origin (Target, Nontarget) revealed an effect of Load Level that approached significance, $F(1,23)=4.23$, $p=0.051$, $\eta^2=0.16$. There was no significant main effect of Saccade Destination, $F(1,23)=0.68$, $p=0.419$, $\eta^2=0.03$. There was, however, a significant interaction between Load Level and Saccade Destination, $F(1,23)=16.83$, $p<0.001$, $\eta^2=0.42$. The significant interaction was followed up by paired samples t-tests. Under low load, there was no significant difference between saccade peak velocities for saccades departing a target (M=259°/s) versus saccades departing a nontarget (M=262°/s), t(23)=0.97, p=0.340, Cohen's D=0.20. Under high load, however, saccade peak velocities were significantly higher when departing targets (M=261°/s) than when departing nontargets (M=254°/s), t(23)=2.77, p=0.011, Cohen's D=0.57.

EEG Results

Figure 7:
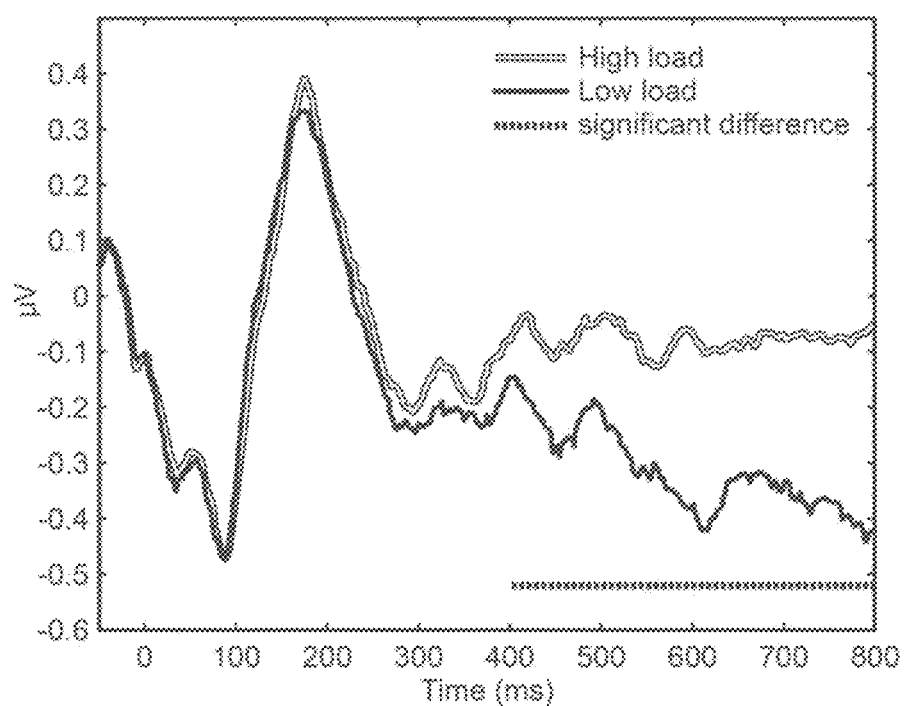
FIGS. 7-10 illustrate experimental data obtained during validation of the disclosure.
Figure 8:
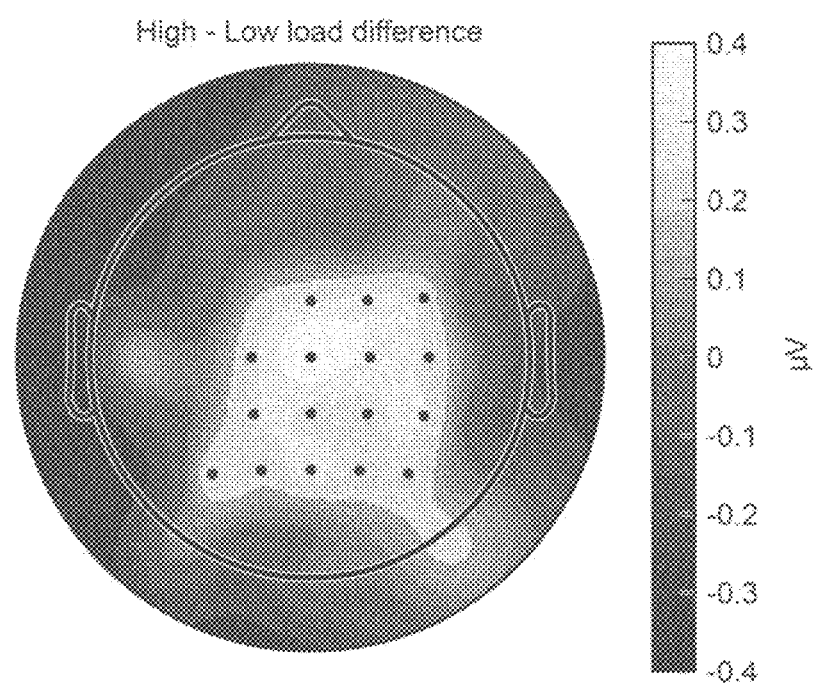

A cluster-permutation analysis performed on the difference between fERPs elicited by fixation on nontargets during high versus low load search revealed a cluster of significant responses at eight central electrodes between 402 ms post fixation until the end of the analysis window at 800 ms post fixation, p=0.008, (FIGS. 7 and 8).

FIG. 7 illustrates average fERPs averaged across the significant electrodes from the cluster permutation analysis. Horizontal black line indicates the significant period.

FIG. 8 illustrates a scalp distribution of the difference in fERPs between high and low load search, averaged across the time period of significant difference. Electrodes that showed a significant difference are shown by black dots.

A time-frequency power analysis locked to the time of fixation onset revealed several significant differences in the patterns of oscillatory power change between high and low load, however, none of these survived correction for multiple comparisons. These were: a decrease in 5 Hz theta power from prior to fixation onset until roughly 240 ms, an increase in 15-25 Hz beta power from around 100 ms post fixation onset until 275 ms post fixation onset, an increase in 4 Hz theta power from 420 ms until 620 ms post fixation onset, and finally a decrease in 12-14 Hz alpha power from 590 ms post fixation onset until the end of the analysis window at 800 ms.

Figure 9:
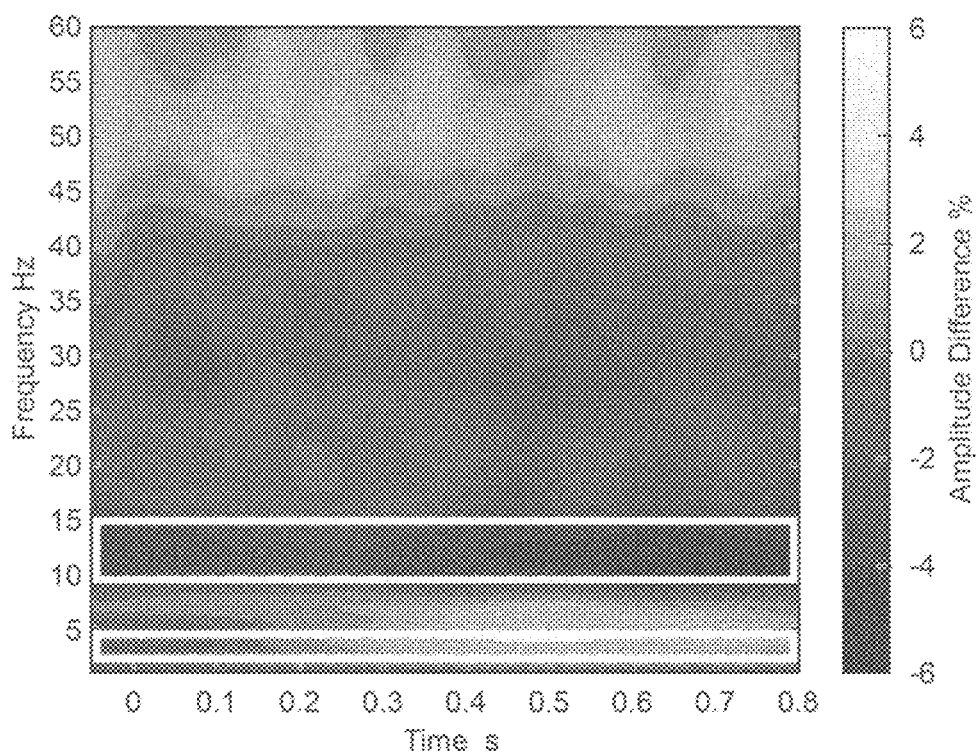

An analysis of time-frequency power, collapsed across time and examining only the overall difference between high and low load revealed significantly higher 4 Hz power in high load, p=0.044, and significantly lower alpha power in a band from 10-15 Hz, minimum p<0.001, all effects corrected for multiple comparisons with FDR correction (FIG. 9).

FIG. 9 shows the difference in time frequency power averaged across all channels (high-low load). White boxes indicate significant differences.

An analysis of inter-trial phase consistency (ITPC) locked to nontarget-fixation onset revealed significantly higher ITPC during high-load search than low-load search from 3-6 Hz, beginning at fixation onset and continuing until 194 ms post fixation, and from 12-14 Hz, between 254 ms and 327 ms post fixation onset. ITPC was significantly lower in high-load search than low-load search from 46-60 Hz between 287 ms and 371 ms post fixation onset, and at 3 Hz from 595 ms until 800 ms post fixation onset.

Figure 10:
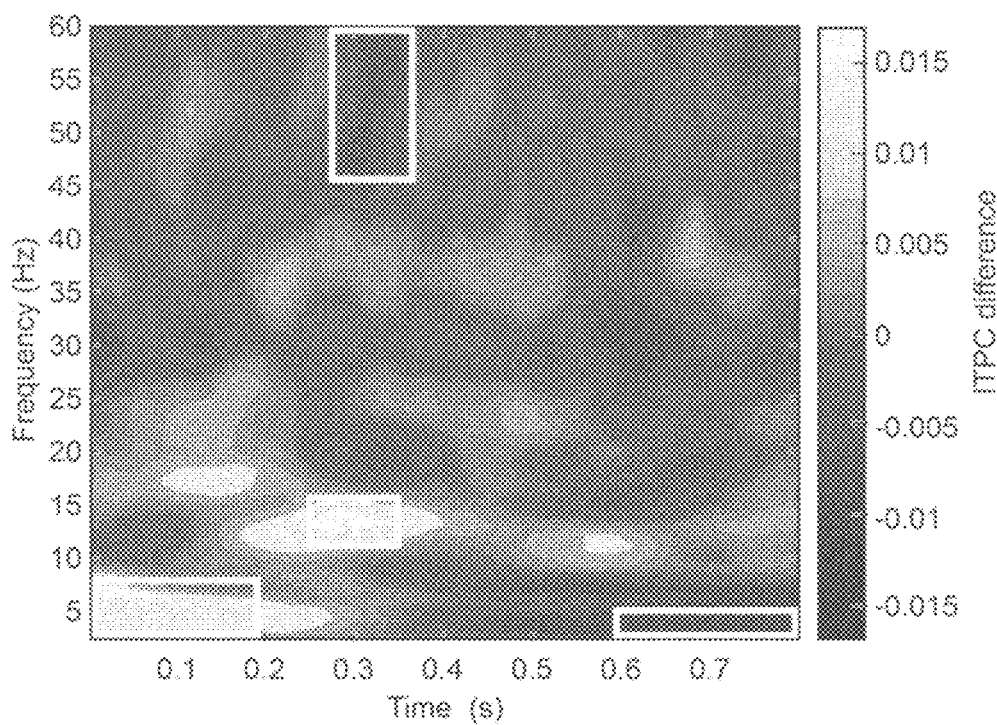

FIG. 10 shows time frequency inter-trial phase consistency averaged across all channels (high-low load). White boxes indicate significant differences.

The invention claimed is:

1. A control system for controlling a transition between a first driving mode and a second driving mode of a vehicle, the second driving mode requiring a higher level of interaction from an occupant than the first driving mode, the control system comprising one or more controllers, the control system configured to:
   receive image data of the occupant of the vehicle;
   quantify one or more characteristics of the occupant's gaze based at least in part on the received image data, the one or more characteristics being indicative of the occupant's attention to a non-driving task;
   determine a transition profile for transitioning between the first driving mode and the second driving mode based at least in part on the one or more characteristics of the occupant's gaze, wherein the transition profile comprises a transition position ahead of the vehicle at which the transition between the first and second driving modes will occur and the control system is configured to adjust the location of the transition position based at least in part on the one or more characteristics of the occupant's gaze; and
   generate and output a control signal to transition from the first driving mode to the second driving mode; wherein the control signal comprises instructions for controlling one or more vehicle systems in accordance with the transition profile.

2. The control system of claim 1, wherein the one or more controllers collectively comprise:
   at least one electronic processor having an electrical input for receiving the image data; and
   at least one memory device electrically coupled to the at least one electronic processor and having instructions stored therein;
   and wherein the at least one electronic processor is configured to access the at least one memory device and execute the instructions thereon so as to generate and output the control signal to the one or more vehicle systems.

3. The control system of claim 1, wherein the one or more characteristics of the occupant's gaze comprises any one or more of: a gaze direction; a gaze duration on a target; a saccade duration; a saccade length; a saccade velocity; and a saccade direction.

4. The control system as claimed in claim 1, configured to determine an attention parameter based at least in part on the one or more characteristics of the occupant's gaze; and determine the transition profile based at least in part on the attention parameter.

5. The control system of claim 4, wherein the attention parameter comprises a relative measurement of a perceptual load of the occupant when engaging with the non-driving task.

6. The control system as claimed in claim 4, configured to:
receive data indicative of a type of non-driving task being performed;
identify the non-driving task being performed by the occupant based at least in part on the received data; and
determine the attention parameter based at least in part on the identified non-driving task.

7. The control system of claim 6, wherein the data indicative of the non-driving task being performed comprises image data of the occupant.

8. The control system of claim 1, wherein the control signal comprises instructions for controlling one or more vehicle output devices for providing an audio, a visual, and/or a haptic transition indicator to the occupant, the or each transition indicator notifying the occupant of an upcoming transition between the first and second driving modes.

9. The control system as claimed in claim 8, configured to adjust one or more of an intensity/volume and/or duration of the or each transition indicator based at least in part on the one or more characteristics of the occupant's gaze.

10. The control system of claim 1, wherein the transition profile comprises a time period within which a transition between the first and second driving modes is to occur; and wherein the control system is configured to adjust the time period based at least in part on the one or more characteristics of the occupant's gaze.

11. The control system as claimed in claim 1, configured to receive an input signal indicative of a request to transition between driving modes.

12. The control system as claimed in claim 1, configured to:
monitor the occupant's response to the transition from the first driving mode to the second driving mode before and/or during the transition; and
output a further control signal to one or more vehicle systems to transfer the vehicle to a third driving mode, at any time before or during the transition from the first driving mode to the second driving mode, based at least in part on the occupant's response to the transition not meeting one or more response criteria.

13. A system for controlling a transition between a first driving mode and a second driving mode of a vehicle, the system comprising:
a control system as claimed in claim 1; and
an image sensor configured to obtain image data of an occupant of the vehicle.

14. A vehicle comprising the control system of claim 1.

15. The control system as claimed in claim 11, wherein the input signal is received from a vehicle control module.

16. A method for controlling a transition between a first driving mode and a second driving mode of a vehicle, the second driving mode requiring a higher level of interaction from an occupant than the first driving mode, the method comprising:
receiving image data of an occupant of the vehicle;
quantifying one or more characteristics of the occupant's gaze based at least in part on the received image data, the one or more characteristics being indicative of the occupant's attention to a non-driving task;
determining a transition profile for transitioning between the first driving mode and the second driving mode based at least in part on the one or more characteristics of the occupant's gaze, wherein the transition profile comprises a transition position ahead of the vehicle at which the transition between the first and second driving modes will occur;
adjusting the time period and/or the location of the transition position based at least in part on the one or more characteristics of the occupant's gaze; and
generating and outputting a control signal to transition from the first driving mode to the second driving mode, the control signal comprising instructions for controlling one or more vehicle systems in accordance with the determined transition profile.

17. A non-transitory, computer-readable storage medium storing instructions thereon that, when executed by one or more electronic processors, causes the one or more electronic processors to carry out the method of claim 16.

18. The method as claimed in claim 16, wherein the transition profile further comprises a time period within which a transition between the first and second driving modes is to occur.

* * * * *